(12) United States Patent
Shinoda et al.

(10) Patent No.: US 8,530,013 B2
(45) Date of Patent: Sep. 10, 2013

(54) FUEL HOSE

(75) Inventors: Atsuhiro Shinoda, Isehara (JP); Hiroshi Kumagai, Yamato (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 273 days.

(21) Appl. No.: 12/993,195

(22) PCT Filed: May 20, 2009

(86) PCT No.: PCT/JP2009/059270
§ 371 (c)(1),
(2), (4) Date: Nov. 17, 2010

(87) PCT Pub. No.: WO2009/142241
PCT Pub. Date: Nov. 26, 2009

(65) Prior Publication Data
US 2011/0088804 A1    Apr. 21, 2011

(30) Foreign Application Priority Data

May 21, 2008 (JP) .................................. 2008-133020
May 21, 2008 (JP) .................................. 2008-133022
May 18, 2009 (JP) .................................. 2009-119967

(51) Int. Cl.
*B29D 22/00* (2006.01)
(52) U.S. Cl.
USPC ....... 428/35.2; 428/36.91; 428/35.4; 138/137
(58) Field of Classification Search
USPC .................. 428/35.2, 36.91, 35.4; 138/137
See application file for complete search history.

(56) References Cited

U.S. PATENT DOCUMENTS

| | | | | |
|---|---|---|---|---|
| 3,858,052 A | * | 12/1974 | Luska | 250/548 |
| 4,043,958 A | * | 8/1977 | Whelan | 521/140 |
| 5,427,831 A | | 6/1995 | Stevens | |
| 5,679,425 A | | 10/1997 | Plumley | |
| 6,333,386 B1 | * | 12/2001 | Nishiyama et al. | 525/213 |
| 6,340,511 B1 | * | 1/2002 | Kanbe et al. | 428/36.91 |
| 6,391,963 B1 | * | 5/2002 | Nishiyama | 524/565 |
| 2001/0051241 A1 | * | 12/2001 | Kanbe et al. | 428/36.8 |
| 2003/0066568 A1 | * | 4/2003 | Hibino et al. | 138/121 |
| 2003/0113464 A1 | | 6/2003 | Fukushi et al. | |
| 2007/0066568 A1 | * | 3/2007 | Dalton et al. | 514/80 |
| 2007/0227609 A1 | * | 10/2007 | Kurimoto et al. | 138/137 |
| 2008/0241449 A1 | * | 10/2008 | Fukaya et al. | 428/36.8 |
| 2010/0021665 A1 | * | 1/2010 | Jackson | 428/36.91 |
| 2010/0062201 A1 | * | 3/2010 | Emad et al. | 428/36.91 |
| 2011/0088804 A1 | * | 4/2011 | Shinoda et al. | 138/137 |
| 2011/0105668 A1 | * | 5/2011 | Shimizu et al. | 524/423 |

FOREIGN PATENT DOCUMENTS

| | | |
|---|---|---|
| EP | 0 580 076 A2 | 1/1994 |
| EP | 1156079 A1 | 11/2001 |
| EP | 1975196 A1 | 10/2008 |
| EP | 2212605 | 5/2009 |

(Continued)

*Primary Examiner* — N. Edwards
(74) *Attorney, Agent, or Firm* — Foley & Lardner LLP

(57) ABSTRACT

A fuel hose (10) includes a laminated layer structure including: an intermediate layer (12) containing polyvinyl alcohol and/or an ethylene-vinylalcohol copolymer; an inner layer (11) disposed on an inner periphery of the intermediate layer; and an outer layer (13) disposed on an outer periphery of the intermediate layer and containing a rubber. The inner layer (11) includes: a first component containing nitrile rubber; and cross-linked chains formed of carbon-carbon single bond, and is directly laminated to the intermediate layer (12).

2 Claims, 1 Drawing Sheet

(56) References Cited

FOREIGN PATENT DOCUMENTS

| | | |
|---|---|---|
| JP | 2000-18440 A | 1/2000 |
| JP | 2004-506548 A | 3/2004 |
| JP | 2004-176908 A | 6/2004 |
| JP | 2005-67189 A | 3/2005 |
| JP | 2005-249086 A | 9/2005 |
| WO | WO 2009/061361 A1 | 5/2009 |

* cited by examiner 11  12  13

21  22  23  24

FUEL HOSE

TECHNICAL FIELD

The present invention relates to a fuel hose suitable for vehicles. Particularly, the present invention relates to a fuel hose which is impermeable to alcohol blended fuels and which has excellent interlayer adhesion properties.

BACKGROUND ART

In recent years, regulations to hydrocarbon transpiration gases from vehicular fuels have been greatly tightened particularly in the United States. In response to such regulations, advances are being made in the development of rubber hoses for fuels.

In particular, multi-layered fuel hoses have been proposed. Such a multi-layer structure includes an intermediate layer having a resin material provided as a fuel barrier, and inner and outer layers having rubber materials laminated on both sides of the intermediate layer. This structure provides connection-pipe sealing, fuel impermeability, and flexibility.

A fuel hose has been proposed that has fluorine-contained rubber (FKM) or acrylonitrile-butadiene rubber (NBR) provided as an inner layer, a ternary copolymer fluororesin THV (tetrafluoroethylene-hexafluoropropylene-vinylidenefluoride) with a fuel barrier function provided as an intermediate layer, and epichlorohydrin rubber (ECO) or nitrile rubber (acrylonitrile-butadiene rubber, NBR) provided as an outer layer. Further, a fuel hose having a layer of chlorosulfonated polyethylene rubber (CSM) or chlorinated polyethylene rubber (CPE) laminated on an outer layer of the fuel hose has been proposed (refer to Patent Document 1).

CITATION LIST

Patent Literature

Patent Document 1: Japanese Patent Translation Publication No. 2004-506548

SUMMARY OF INVENTION

Technical Problem

For fuel hoses having a fluororesin as a fuel barrier layer, there is a trend toward a thickened fuel barrier layer to insure a fuel barrier for ethanol blended gasoline that is being produced in response to environmental concerns. However, thickened fuel barrier layers degrade flexibility and workability of hoses. The thicker the fuel barrier layer is, the greater the incompatibility becomes between a fuel barrier property and workability of a fuel hose.

Moreover, to provide proper adhesion between a fluororesin and a rubber layer, it is necessary to provide an adhesive agent layer, provide a primer process, and blend an adhesive activator to the rubber layer. An adhesive agent in use may have unreacted adhesive components extracted in a fuel, which may have influences on peripheral component parts.

The present invention has been devised in view of such issues in conventional fuel hoses using a fluororesin as a fuel barrier layer. It is an object of the present invention to provide a fuel hose with a preferable fuel barrier property relative to present fuel-proof barrier techniques, an enhanced adhesiveness to a rubber layer, and an excellent fuel barrier property to alcohol blended fuels.

Solution to Problem

To achieve the object described, a fuel hose according to the present invention comprises a laminated layer structure including: an intermediate layer containing polyvinyl alcohol and/or an ethylene-vinylalcohol copolymer; an inner layer disposed on an inner periphery of the intermediate layer; and an outer layer disposed on an outer periphery of the intermediate layer and containing a rubber. The inner layer comprises: a first component containing nitrile rubber; and cross-linked chains formed of carbon-carbon single bond, and is directly laminated to the intermediate layer.

Advantageous Effects of Invention

According to the present invention, a fuel hose is provided with an excellent fuel barrier property to alcohol blended fuels, an enhanced adhesiveness between an intermediate layer and a rubber layer of an inner layer, and excellent resistance to extraction of adhesive components.

DESCRIPTION OF EMBODIMENTS

The following are descriptions of fuel hoses according to embodiments of the present invention. It is noted that "%" represents a percentage by mass, unless otherwise specified.

Figure 1:
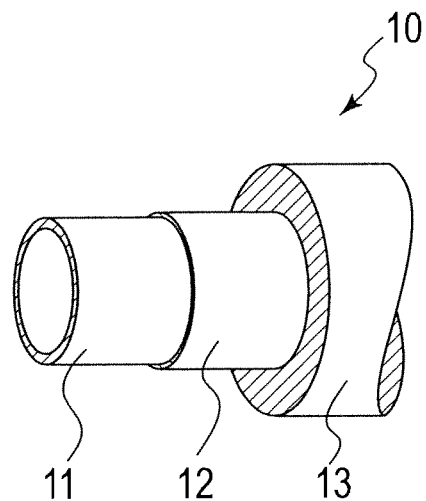
FIG. 1 is a perspective view of a fuel hose according to an embodiment of the present invention.

A fuel hose 10 according to an embodiment of the present invention shown in FIG. 1 is used as a fuel vapor hose for vehicles using an alcohol blended fuel, for instance. The fuel hose 10 has a laminated layer structure including an intermediate layer 12 containing polyvinyl alcohol (PVOH) and/or an ethylene-vinylalcohol (EVOH) copolymer, an inner layer 11 disposed on an inner periphery of the intermediate layer 12, and an outer layer 13 disposed on an outer periphery of the intermediate layer 12 and containing a rubber. The inner layer 11 contains a first component containing nitrile rubber (NBR), and has cross-linked chains formed of carbon-carbon single bond. The inner layer 11 is directly laminated to the intermediate layer 12. The inner layer 11 is an innermost layer of the laminated layer structure constituting the fuel hose 10, and serves as a contact layer for a fuel to be transferred through the fuel hose 10.

The fuel hose 10 includes the intermediate layer 12 containing PVOH and/or the EVOH copolymer that has excellent barrier properties to alcohol blended fuels and excellent adhesiveness to a rubber as described above. Therefore, the fuel hose 10 can be thinner in wall thickness than conventional hoses using a thick fluororesin, while having a barrier property that is equivalent to the conventional hoses. Due to a thinner wall thickness, the fuel hose 10 can ensure flexibility and workability.

The inner layer 11 contains a vulcanized rubber that is composed mainly of NBR having cross-linked chains formed of carbon-carbon single bond. Therefore, the inner layer 11 can be directly laminated to the intermediate layer 12 without intervenient layers of different components therebetween. In the present invention, the condition that "the inner layer 11 is directly laminated to the intermediate layer 12" represents the condition that the inner layer 11 and the intermediate layer 12 are directly contacted to adhere to each other without intervenient layers of different components from the intermediate layer 12 such as an adhesive layer between the inner layer 11 and the intermediate layer 12. "The rubber composed mainly of NBR" represents a rubber containing 50% or more of NBR. NBR is preferably a medium-high nitrile rubber containing 31% by mass or more of acrylonitrile (AN). When AN is less than 31% by mass, there is a tendency to increase fuel permeability through an end of a fuel hose. Namely, it may be difficult to ensure fuel permeability.

A method for vulcanization of the inner layer 11 includes peroxide vulcanization to provide a cross-linked substance composed of cross-linked chains formed of carbon-carbon single bond (C—C), using a cross-linking agent such as dicumyl peroxide (DCP) in view of adhesiveness to the intermediate layer 12. By directly laminating a rubber composed mainly of NBR to the intermediate layer 12 of PVOH and/or the EVOH copolymer or a resin composed mainly of a blended substance of those, followed by peroxide vulcanization, the fuel hose 10 can ensure an enhanced interlayer adhesion and an excellent barrier property to alcohol blended fuels. Due to the secure interlayer adhesion, the fuel hose 10 is not required to add adhesive components to an inner rubber of the intermediate layer 12, or apply an adhesive agent to a surface of a resin layer. Accordingly, the fuel hose 10 has an excellent fuel barrier property, an enhanced adhesiveness, and excellent workability.

The above-mentioned method can suppress extraction of adhesive components to fuels since the method is not required to use an adhesive agent or the like. In addition, the method is not required to have intervenient layers containing adhesive components between the intermediate layer 12 and the inner layer 11. Thus, the entire wall thickness of the fuel hose can be reduced. Accordingly, a fuel hose is provided with excellent flexibility.

The inner layer 11 preferably further contains, in addition to NBR as the first component, one or more second components selected from the group consisting of polyvinyl chloride (PVC), ethylene-acrylic rubber (AEM), ethylene-propylene rubber (EPM), and ethylene-propylene-diene rubber (EPDM). Namely, in addition to NBR used alone, the inner layer 11 contains an arbitrary mixture of NBR and a second component, such as a blended rubber of NBR and PVC, a blended rubber of NBR and EPDM, a blended rubber of NBR and EPM, a blended rubber of NBR and AEM, and a blended rubber of NBR, PVC and AEM.

The proportion of the second components to the inner layer 11 is preferably 40% by mass or less when using PVC, and preferably 5% by mass to 30% by mass when using AEM, EPM and EPDM. When the proportion of PVC exceeds 40% by mass, flexibility of the inner layer 11 may be reduced. When the proportion of AEM, EPM and EPDM exceeds 30% by mass, there is a tendency to increase fuel permeability through an end of the fuel hose. Accordingly, it may be difficult to ensure fuel permeability. When the proportion of AEM, EPM and EPDM is less than 5% by mass, there is a tendency to decrease the adhesion to the intermediate layer 12. Accordingly, it may be difficult to ensure the interlayer adhesion. It is noted that the proportion of the second components represents a mass ratio of the second components to the total mass of the inner layer 11.

"The resin composed mainly of PVOH and/or the EVOH copolymer" composing the intermediate layer 12 is a resin containing 70% by mass or more of those components. Such a resin has an excellent barrier property to alcohol blended fuels (anti-fuel-permeability, for example) and has excellent adhesiveness to a rubber. In order to ensure a barrier property of the intermediate layer 12, a copolymerization ratio of the ethylene-vinylalcohol copolymer is preferably within a range of ethylene:vinylalcohol=20:80 to 38:62 in molar ratio. When using a mixture of polyvinyl alcohol and the ethylene-vinylalcohol copolymer, namely a blended resin, a blend ratio of those is preferably between 0:100 and 30:70.

The fuel hose 10 suppresses extraction of adhesive components to fuels as described above. As an index of extraction, there is the following one. First, a liquid of isooctane, toluene and ethanol, which are mixed by ratios of 45:45:10 by volume, is sealed inside the inner layer 11, and left at a temperature of 40° C. for 168 hours (one week), whereby an extract from the fuel hose 10 is obtained. The total amount of respective components of a phenol compound, an epoxy compound, an acrylic compound, an isocyanate compound, a silane coupling agent and an osmium compound in hexane insoluble materials contained in the obtained extract is 0.5 mg/cm$^2$ or less in mass conversion per area of an inside surface of the inner layer. Those compounds contained in the hexane insoluble materials of the extract may be compounds contained as adhesive components for adhesion between the inner layer 11 and the intermediate layer 12. If the total amount of those compounds exceeds 0.5 mg/cm$^2$ in mass conversion per unit area in contact with the sealed liquid, peripheral parts may be deteriorated or their performances may be influenced. The fuel hose 10 according to the embodiment of the present invention includes no adhesive component for adhesion between the inner layer 11 and the intermediate layer 12. Thus, the total amount of the above compounds falls within the range of 0.5 mg/cm$^2$ or less in mass conversion per area of the inside surface of the inner layer 11.

The outer layer 13 disposed on an outer periphery of the intermediate layer 12 may have a rubber material containing NBR, and one or more rubber components selected from the group consisting of a blended rubber of NBR and PVC, AEM, EPM, and EPDM. When using a rubber material containing those components for the outer layer 13, the outer layer 13 and the intermediate layer 12 may be directly laminated for vulcanization. Due to such a rubber material, an enhanced interlayer adhesion can be ensured without using specific adhesive components. In this case, an excellent fuel barrier property can be ensured not only for conduction of an alcohol blended fuel in contact with the inner layer 11, but also for conduction of an alcohol blended fuel in contact with the outer layer 13, and even for conduction of an alcohol blended fuel in contact with both the inner layer 11 and the outer layer 13. Vulcanization is preferably peroxide vulcanization similar to the inner layer 11. Both the inner layer 11 and outer layer 13 are thus preferably laminated directly on the intermediate layer 12.

Figure 2:
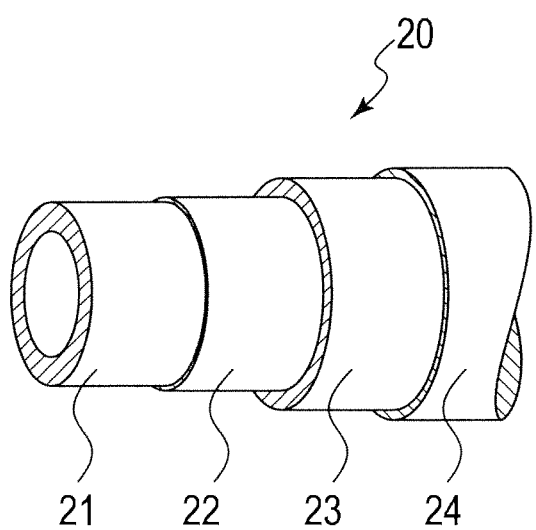
FIG. 2 is a perspective view of a fuel hose according to another embodiment of the present invention.

The fuel hose 10 basically has a three-layer structure composed of the intermediate layer 12, and the inner layer 11 and the outer layer 13 disposed inside and outside thereof. The number of layers is, however, not restrictive as long as the intermediate layer 12 and the inner layer 11 are directly laminated to each other by a peroxide vulcanization adhesion. In other words, the fuel hose 10 may have additional layers such as a cover layer inside the inner layer 11, or may have a second outer layer 24 as a cover layer disposed outside an outer layer 23 as shown in FIG. 2 depending on required performances. Each of the inner layer 11, the intermediate layer 12 and the outer layer 13 may have a multi-layer structure. There may be intervenient layers between the intermediate layer 12 and the outer layer 13.

The fuel hose 10 is characterized by a combination of compositions of the inner layer 11 and the intermediate layer 12, and its method of production is not restricted. For example, the fuel hose 10 may be manufactured by production of a tubular hose with a multi-layer structure. The tubular hose is produced by a tandem extrusion process by multi-layer extrusion of respective layers or by a method of winding a resin to be positioned as an intermediate layer on an inner layer composed of a tubular rubber, followed by peroxide vulcanization. A vulcanization temperature may preferably be controlled within a range of 150 to 165° C., more preferably within a range of 155 to 165° C. A vulcanization time may preferably be within a range of 60 to 90 minutes. In some cases, a primary vulcanization may be followed by a secondary vulcanization.

The fuel hose 10 according to the embodiment of the present invention has a configuration composed of the intermediate layer 12 containing PVOH and/or an EVOH copolymer with an excellent barrier property to alcohol blended fuels, and the inner layer 11 containing a rubber and disposed inside the intermediate layer 12. The fuel hose 10 is thus suitable for vehicles using alcohol blended fuels, or suitable as a vapor hose for vehicular fuel systems. The fuel hose 10 is widely applicable for various purposes other than hoses. For example, the fuel hose 10 can be applied to a container (multi-layer container) for various alcohol-containing liquids, a supply pipe, and a storage tank. A fuel circulated through a fuel hose according to the embodiment of the present invention or stored in a multi-layer container includes gasoline, diesel fuel, alcohol, LP gas, natural gas, hydrogen and a mixture of any of those. However, the fuel is not limited to the above-mentioned ones.

EXAMPLE

Specific examples will be described according to the embodiments of the present invention. The present invention is, however, not limited to these examples.

Example 1

A fuel hose 10 with a three-layer structure illustrated in FIG. 1, including NBR as an inner layer 11 (acrylonitrile amount=40%, vulcanizing system: peroxide vulcanization), EVOH (F101 manufactured by KURARAY CO., LTD., ethylene:vinylalcohol=32:68) as an intermediate layer 12, and a blended rubber of NBR:PVC=60:40 (vulcanizing system: peroxide vulcanization) as an outer layer 13, was manufactured in Example 1. The inner layer 11, the intermediate layer 12, and the outer layer 13 were extruded under the condition of a cylinder temperature of 80° C. and a die temperature of 90° C. to obtain a tubular hose, followed by vulcanizing for 40 minutes at 150° C.

The fuel hose obtained in Example 1 had an inner layer thickness of 0.5 mm, an intermediate layer thickness of 0.1 mm, and an outer layer thickness of 3.4 mm, with a hose outside diameter of 32.4 mm, a hose inside diameter of 24.4 mm, and a hose length of 300 mm.

Example 2

A three-layer structure identical to Example 1 was employed to obtain a fuel hose of Example 2, except for the inner layer 11 and the outer layer 13 composed of a blended rubber of NBR:PVC=60:40 (vulcanizing system: peroxide vulcanization).

Example 3

A three-layer structure identical to Example 1 was employed to obtain a fuel hose of Example 3, except for the inner layer 11 and the outer layer 13 composed of a blended rubber of NBR:PVC=60:40 (vulcanizing system: peroxide vulcanization).

Example 4

A three-layer structure identical to Example 1 was employed to obtain a fuel hose of Example 4, except for the inner layer 11 and the outer layer 13 composed of a blended rubber of NBR:EPM=60:40 (vulcanizing system: peroxide vulcanization).

Example 5

A three-layer structure identical to Example 1 was employed to obtain a fuel hose of Example 5, except for the intermediate layer 12 composed of an EVOH copolymer resin of ethylene:vinylalcohol=24:76.

Example 6

A three-layer structure identical to Example 5 was employed to obtain a fuel hose of Example 6, except for the inner layer 11 and the outer layer 13 composed of a blended rubber of NBR:PVC=60:40 (vulcanizing system:peroxide vulcanization).

Example 7

A three-layer structure identical to Example 5 was employed to obtain a fuel hose of Example 7, except for the inner layer 11 and the outer layer 13 composed of a blended rubber of NBR:EPDM=60:40 (vulcanizing system:peroxide vulcanization).

Example 8

A three-layer structure identical to Example 5 was employed to obtain a fuel hose of Example 8, except for the inner layer 11 and the outer layer 13 composed of a blended rubber of NBR:EPM=60:40 (vulcanizing system: peroxide vulcanization).

Example 9

A three-layer structure identical to Example 1 was employed to obtain a fuel hose of Example 9, except for the intermediate layer 12 composed of PVOH.

Example 10

A three-layer structure identical to Example 9 was employed to obtain a fuel hose of Example 10, except for the inner layer 11 and the outer layer 13 composed of a blended rubber of NBR:PVC=60:40 (vulcanizing system: peroxide vulcanization).

Example 11

A three-layer structure identical to Example 9 was employed to obtain a fuel hose of Example 11, except for the inner layer 11 and the outer layer 13 composed of a blended rubber of NBR:EPDM=60:40 (vulcanizing system:peroxide vulcanization).

Example 12

A three-layer structure identical to Example 9 was employed to obtain a fuel hose of Example 12, except for the inner layer 11 and the outer layer 13 composed of a blended rubber of NBR:EPM=60:40 (vulcanizing system: peroxide vulcanization).

Example 13

A three-layer structure identical to Example 1 was employed to obtain a fuel hose of Example 13, except for the outer layer 13 composed of ECO.

Example 14

A three-layer structure identical to Example 1 was employed to obtain a fuel hose of Example 14, except for the inner layer 11 and the outer layer 13 composed of a blended rubber of NBR:PVC:AEM=50:20:30 (vulcanizing system: peroxide vulcanization).

Example 15

A three-layer structure identical to Example 1 was employed to obtain a fuel hose of Example 15, except for the inner layer 11 and the outer layer 13 composed of a blended rubber of NBR:AEM=95:5 (vulcanizing system: peroxide vulcanization).

Example 16

A three-layer structure identical to Example 1 was employed to obtain a fuel hose of Example 16, except for the inner layer 11 and the outer layer 13 composed of a blended rubber of NBR:PVC:EPDM=67:28:5 (vulcanizing system: peroxide vulcanization).

Example 17

A three-layer structure identical to Example 1 was employed to obtain a fuel hose of Example 17, except for the inner layer 11 and the outer layer 13 composed of a blended rubber of NBR:PVC:EPDM=50:20:30 (vulcanizing system: peroxide vulcanization).

Example 18

A multi-layer fuel hose with a four-layer structure illustrated in FIG. 2 was employed in Example 18. This example included an inner layer 21 and an outer layer 23 composed of a blended rubber of NBR:EPDM=70:30 (vulcanizing system: peroxide vulcanization), and an intermediate layer 22 composed of EVOH (F101 manufactured by KURARAY CO., LTD., ethylene:vinylalcohol=32:68), which were prepared by a method identical to Example 1, in addition to a second outer layer 24 composed of CSM and disposed outside the outer layer 23, so as to obtain the fuel hose in this example.

The fuel hose obtained in Example 18 had an inner layer thickness of 1.5 mm, an intermediate layer thickness of 0.1 mm, an outer layer thickness of 1.9 mm, and a second outer layer thickness of 0.5 mm, with a hose outside diameter of 32.4 mm, a hose inside diameter of 24.4 mm, and a hose length of 300 mm.

Example 19

A three-layer structure identical to Example 14 was employed to obtain a fuel hose of Example 19, except for the intermediate layer 12 composed of an EVOH copolymer resin of ethylene:vinylalcohol=24:76.

Example 20

A three-layer structure identical to Example 15 was employed to obtain a fuel hose of Example 20, except for the intermediate layer 12 composed of an EVOH copolymer resin of ethylene:vinylalcohol=24:76.

Example 21

A three-layer structure identical to Example 16 was employed to obtain a fuel hose of Example 21, except for the intermediate layer 12 composed of an EVOH copolymer resin of ethylene:vinylalcohol=24:76.

Example 22

A three-layer structure identical to Example 17 was employed to obtain a fuel hose of Example 22, except for the intermediate layer 12 composed of an EVOH copolymer resin of ethylene:vinylalcohol=24:76.

Example 23

A four-layer structure identical to Example 18 was employed to obtain a fuel hose of Example 23, except for the intermediate layer 12 composed of an EVOH copolymer resin of ethylene:vinylalcohol=24:76.

Example 24

A three-layer structure identical to Example 14 was employed to obtain a fuel hose of Example 24, except for the intermediate layer 12 composed of PVOH.

Example 25

A three-layer structure identical to Example 15 was employed to obtain a fuel hose of Example 25, except for the intermediate layer 12 composed of PVOH.

Example 26

A three-layer structure identical to Example 16 was employed to obtain a fuel hose of Example 26, except for the intermediate layer 12 composed of PVOH.

Example 27

A three-layer structure identical to Example 17 was employed to obtain a fuel hose of Example 27, except for the intermediate layer 12 composed of PVOH.

Example 28

A four-layer structure identical to Example 18 was employed to obtain a fuel hose of Example 28, except for the intermediate layer 12 composed of PVOH.

Comparative Example 1

A fuel hose with a four-layer structure including an intervenient layer intervening between an intermediate layer and an outer layer was employed in Comparative Example 1. This example included an inner layer composed of NBR (vulcanizing system: peroxide vulcanization), the intermediate layer composed of a ternary copolymer fluororesin THV, and the outer layer composed of CSM, which were prepared by a method identical to Example 1, in addition to the intervenient layer between the outer layer and the intermediate layer composed of NBR identical to the inner layer, so as to obtain the fuel hose in this example.

The fuel hose obtained in Comparative Example 1 had an inner layer thickness of 1.5 mm, an intermediate layer thickness of 0.1 mm, an intervenient layer thickness of 1.9 mm, and an outer layer thickness of 0.5 mm, with a hose outside diameter of 32.4 mm, a hose inside diameter of 24.4 mm, and a hose length of 300 mm.

Comparative Example 2

A four-layer structure identical to Comparative Example 1 was employed to obtain a fuel hose of Comparative Example 2, except for the inner layer and the outer layer composed of NBR (acrylonitrile amount=40%, vulcanizing system:sulfur vulcanization) with an addition of 1, 5-diazabicyclo[4.3.0]-nonene-5 as an adhesive component for adhesion to the intermediate layer, and the intermediate layer composed of a ternary copolymer fluororesin THV.

The fuel hose obtained in Comparative Example 2 had an inner layer thickness of 1.5 mm, an intermediate layer thickness of 0.1 mm, an outer layer thickness of 1.9 mm, and a second outer layer thickness of 0.5 mm, with a hose outside diameter of 32.4 mm, a hose inside diameter of 24.4 mm, and a hose length of 300 mm.

Comparative Example 3

A four-layer structure identical to Comparative Example 2 was employed to obtain a fuel hose of Comparative Example 3, except for the inner layer and the outer composed of NBR with the acrylonitrile amount of 30%.

The respective fuel hoses obtained in the foregoing examples and comparative examples were subjected to a fuel permeability test, an adhesion test and a fuel extraction test, and performances of those fuel hoses were evaluated. The results thereof are listed in Tables 1 and 2.

[Fuel Permeability Test]

A mixed fuel of commercially available regular gasoline (90 vol %) and ethanol (10 vol %) was poured in a stainless steel test container, where each fuel hose obtained in the examples and comparative examples was fixed at one end thereof by a clamp, while the other end was fixed by a clamp to a stainless steel sealing plug. Under this condition, each fuel hose was left in an atmosphere of 40° C. for 20 weeks. Thereafter, a fuel permeation rate was measured using SHED (Sealed Housing For Evaporative Determination) under specified conditions of CARB (California Air Resources Board).

In Tables 1 and 2, "double circle (⊚)" denotes a permeation rate smaller than one tenth of that of the multi-layer hose of Comparative Example 1, and "single circle (○)" denotes an equivalent permeation rate to the multi-layer hose of Comparative Example 1.

[Adhesion Test]

A mixed fuel of commercially available regular gasoline (90 vol %) and ethanol (10 vol %) was sealed in each fuel hose of the examples and comparative examples, which was left at 60° C. for 168 hours. After removal of sealed liquid, each fuel hose was left at room temperature for 10 minutes. Then, test pieces were punched out from the respective fuel hoses so that each test piece had a size of 10 mm width by 200 mm length, and a thickness of the fuel hose itself.

A part of the intermediate layer was peeled from a part of an inner rubber layer (as the inner layer) in contact with the intermediate layer at an arbitrary location of each punched test piece to some extent, and held by a grip of a tester. The tester was operated under prescribed conditions in JIS K6256, describing a tensile load curve on a graph. An average value of wavy sections in the graph was determined as an exfoliation load, and exfoliation strength was calculated, such that:

Exfoliation strength (N/cm)=Exfoliation load (N)/Test piece width (cm)

In Tables 1 and 2, "double circle (⊚)" denotes an exfoliation strength greater than that of the multi-layer hose of Comparative Example 1, and "single circle (○)" denotes an equivalent strength to the multi-layer hose of Comparative Example 1.

[Fuel Extraction Test]

A mixed fuel of isooctane (45 vol %), toluene (45 vol %), and ethanol (10 vol %) was sealed in each fuel hose of the examples and comparative examples, which was left at 40° C. for 168 hours. Thereafter, sealed liquid was removed as an extract. The extract was dried and concentrated by exposure to blown air. The concentrated liquid was mixed with hexane, which was stirred for one hour or more by an ultrasonic cleaner.

After the mixed liquid was left for 24 hours, supernatant liquid was removed, and precipitates were vacuum-dried at 40° C. for 8 hours. Insoluble substances thus obtained were taken as hexane insoluble materials.

The total amount of a phenol compound, an epoxy compound, an acrylic compound, an isocyanate compound, a silane coupling agent, and an osmium compound in the hexane insoluble materials were measured by use of analyzers such as a gas chromatography-mass spectrometer (GC-MS) and an infrared spectroscopy (IR). Then, the total amount of the above components was calculated in mass conversion (mg/cm$^2$) per area of an inside surface of the multi-layer hose. In Tables 1 and 2, "single circle (○)" denotes the total amount within a range of 0.5 mg/cm$^2$ or less, and "triangle (Δ)" denotes the total amount exceeding 0.5 mg/cm$^2$.

TABLE 1

| | Hose Structure | | | | | Hose Property | | | |
| --- | --- | --- | --- | --- | --- | --- | --- | --- | --- |
| Section | Inner Layer | Intermediate Layer | Intervenient Layer | Outer Layer | Second Outer Layer | Fuel Permeability | Adhesiveness | Fuel Extraction | Total Evaluation |
| Example 1 | NBR | EVOH (Copolymerization Ratio = 32:68) | — | NBR + PVC | — | ⊚ | ⊚ | ○ | ⊚ |
| Example 2 | NBR + PVC | EVOH (Copolymerization Ratio = 32:68) | — | NBR + PVC | — | ⊚ | ⊚ | ○ | ⊚ |
| Example 3 | NBR + EPDM | EVOH (Copolymerization Ratio = 32:68) | — | NBR + EPDM | — | ⊚ | ⊚ | ○ | ⊚ |

TABLE 1-continued

| Section | Hose Structure | | | | | Hose Property | | | |
|---|---|---|---|---|---|---|---|---|---|
| | Inner Layer | Intermediate Layer | Intervenient Layer | Outer Layer | Second Outer Layer | Fuel Permeability | Adhesiveness | Fuel Extraction | Total Evaluation |
| Example 4 | NBR + EPM | EVOH (Copolymerization Ratio = 32:68) | — | NBR + EPM | — | ◎ | ◎ | ○ | ◎ |
| Example 5 | NBR | EVOH (Copolymerization Ratio = 24:76) | — | NBR + PVC | — | ◎ | ◎ | ○ | ◎ |
| Example 6 | NBR + PVC | EVOH (Copolymerization Ratio = 24:76) | — | NBR + PVC | — | ◎ | ◎ | ○ | ◎ |
| Example 7 | NBR + EPDM | EVOH (Copolymerization Ratio = 24:76) | — | NBR + EPDM | — | ◎ | ◎ | ○ | ◎ |
| Example 8 | NBR + EPM | EVOH (Copolymerization Ratio = 24:76) | — | NBR + EPM | — | ◎ | ◎ | ○ | ◎ |
| Example 9 | NBR | PVOH | — | NBR + PVC | — | ◎ | ◎ | ○ | ◎ |
| Example 10 | NBR + PVC | PVOH | — | NBR + PVC | — | ◎ | ◎ | ○ | ◎ |
| Example 11 | NBR + EPDM | PVOH | — | NBR + EPDM | — | ◎ | ◎ | ○ | ◎ |
| Example 12 | NBR + EPM | PVOH | — | NBR + EPM | — | ◎ | ◎ | ○ | ◎ |
| Example 13 | NBR | EVOH (Copolymerization Ratio = 32:68) | — | ECO | — | ◎ | ◎ | ○ | ◎ |
| Comparative Example 1 | NBR | THV | NBR | CSM | — | ○ | ○ | △ | ○ |
| Comparative Example 2 | NBR | THV | NBR | CSM | — | ○ | ○ | △ | ○ |
| Comparative Example 3 | NBR | THV | NBR | CSM | — | ○ | ○ | △ | ○ |

TABLE 2

| Section | Hose Structure | | | | | Hose Property | | | |
|---|---|---|---|---|---|---|---|---|---|
| | Inner Layer | Intermediate Layer | Intervenient Layer | Outer Layer | Second Outer Layer | Fuel Permeability | Adhesiveness | Fuel Extraction | Total Evaluation |
| Example 14 | NBR + PVC + AEM | EVOH (Copolymerization Ratio = 32:68) | — | NBR + PVC + AEM | — | ◎ | ◎ | ○ | ◎ |
| Example 15 | NBR + AEM | EVOH (Copolymerization Ratio = 32:68) | — | NBR + AEM | — | ◎ | ◎ | ○ | ◎ |
| Example 16 | NBR + PVC + EPDM | EVOH (Copolymerization Ratio = 32:68) | — | NBR + PVC + EPDM | — | ◎ | ◎ | ○ | ◎ |
| Example 17 | NBR + PVC + EPDM | EVOH (Copolymerization Ratio = 32:68) | — | NBR + PVC + EPDM | — | ◎ | ◎ | ○ | ◎ |
| Example 18 | NBR + EPDM | EVOH (Copolymerization Ratio = 32:68) | — | NBR + EPDM | CSM | ◎ | ◎ | ○ | ◎ |
| Example 19 | NBR + PVC + AEM | EVOH (Copolymerization Ratio = 24:76) | — | NBR + PVC + AEM | — | ◎ | ◎ | ○ | ◎ |
| Example 20 | NBR + AEM | EVOH (Copolymerization Ratio = 24:76) | — | NBR + AEM | — | ◎ | ◎ | ○ | ◎ |
| Example 21 | NBR + PVC + EPDM | EVOH (Copolymerization Ratio = 24:76) | — | NBR + PVC + EPDM | — | ◎ | ◎ | ○ | ◎ |
| Example 22 | NBR + PVC + EPDM | EVOH (Copolymerization Ratio = 24:76) | — | NBR + PVC + EPDM | — | ◎ | ◎ | ○ | ◎ |
| Example 23 | NBR + EPDM | EVOH (Copolymerization Ratio = 24:76) | — | NBR + EPDM | CSM | ◎ | ◎ | ○ | ◎ |
| Example 24 | NBR + PVC + AEM | PVOH | — | NBR + PVC + AEM | — | ◎ | ◎ | ○ | ◎ |

TABLE 2-continued

| Section | Hose Structure | | | | | Hose Property | | | |
| --- | --- | --- | --- | --- | --- | --- | --- | --- | --- |
| | Inner Layer | Intermediate Layer | Intervenient Layer | Outer Layer | Second Outer Layer | Fuel Permeability | Adhesiveness | Fuel Extraction | Total Evaluation |
| Example 25 | NBR + AEM | PVOH | — | NBR + AEM | — | ◎ | ◎ | ○ | ◎ |
| Example 26 | NBR + PVC + EPDM | PVOH | — | NBR + PVC + EPDM | — | ◎ | ◎ | ○ | ◎ |
| Example 27 | NBR + PVC + EPDM | PVOH | — | NBR + PVC + EPDM | — | ◎ | ◎ | ○ | ◎ |
| Example 28 | NBR + EPDM | PVOH | — | NBR + EPDM | CSM | ◎ | ◎ | ○ | ◎ |

(Results)

As shown in Tables 1 and 2, it was verified that all the fuel hoses in Examples 1 to 28 had superior properties compared to the fuel hoses in the comparative examples. It was verified that the respective fuel hoses in Examples 1 to 28 had a sufficient interlayer adhesion property between the inner layer of a rubber and the intermediate layer as a fuel barrier layer. Moreover, due to a vulcanized adhesion between the inner layer and the intermediate layer, and no adhesive component in the layers, a small amount of fuel extraction was observed in any fuel extraction test, and good results were obtained in the examples. Namely, the fuel hoses in Examples 1 to 28 had an excellent adhesive property due to the intermediate layer of a resin composed mainly of PVOH and/or the EVOH copolymer, and the rubber layers having prescribed components disposed inside and outside the intermediate layer. Further, the respective fuel hoses in Examples 1 to 28 had a sufficient interlayer adhesion property between the inner layer of a rubber and the intermediate layer (fuel barrier layer) compared with the comparative examples using the intermediate layer composed of fluororesin and the inner layer and the outer layer composed of NBR. It was verified that the fuel hoses in Examples 1 to 28 had a small amount of fuel extraction because of no adhesive component in the layers, and had excellent fuel permeation against ethanol blended gasoline.

Although the invention has been described, the invention is not limited to the foregoing embodiments, and modifications may become apparent to those skilled in the art within the scope of the invention.

For example, in the case of a multi-layer hose in which fuels are in direct contact not with an inner layer but with an outer layer of the multi-layer hose, the above-described configuration (for example, the acrylonitrile content in NBR as a constituent is 31% by mass or more) may be employed as a preferred configuration of the outer layer similarly to the preferred configuration of the inner layer.

The entire contents of Japanese Patent Application No. P2008-133020 (filed on May 21, 2008), Japanese Patent Application No. P2008-133022 (filed on May 21, 2008), and Japanese Patent Application No. P2009-119967 (filed on May 18, 2009) are herein incorporated by reference.

REFERENCE SIGNS LIST 10, 20 Fuel hose
11, 21 Inner layer
12, 22 Intermediate layer
13, 23 Outer layer
24 Second outer layer

The invention claimed is:

1. A fuel hose comprising:
a laminated layer structure including:
an intermediate layer containing at least one of polyvinyl alcohol and ethylene-vinylalcohol copolymer;
an inner layer disposed on an inner periphery of the intermediate layer; and
an outer layer disposed on an outer periphery of the intermediate layer and containing a rubber,
wherein the inner layer consists of: nitrile rubber having cross-linked chains formed of carbon-carbon single bond; and polyvinyl chloride, or consists of: nitrile rubber having cross-linked chains formed of carbon-carbon single bond; polyvinyl chloride; and ethylene-acrylic rubber, and
wherein the inner layer is directly laminated to the intermediate layer.

2. The fuel hose according to claim 1, wherein the outer layer comprises: nitrile rubber; and one or more rubber components selected from the group consisting of a blended rubber of nitrile rubber and polyvinyl chloride, ethylene-acrylic rubber, ethylene-propylene rubber, and ethylene-propylene-diene rubber.

* * * * *